Patented Apr. 16, 1929.

1,709,611

UNITED STATES PATENT OFFICE.

JULIUS DRUCKER, OF COLOGNE-ON-THE-RHINE, AND HEINZ THIENEMANN, OF LEVER-KUSEN, NEAR COLOGNE-ON-THE-RHINE, GERMANY, ASSIGNORS TO I. G. FARBEN-INDUSTRIE AKTIENGESELLSCHAFT, OF FRANKFORT-ON-THE-MAIN, GERMANY.

PROCESS FOR THE ACTIVATION OF CARBON.

No Drawing. Application filed October 25, 1926, Serial No. 144,171, and in Germany November 10, 1925.

The present invention concerns the activation of carbon and in particular a process according to which, by the treatment of carbon or substances containing carbon, with the vapor of sulfur or of compounds yielding sulfur by decomposition, activation of the carbon takes place at elevated temperatures, for example at 800 to 1000° C. together with the simultaneous formation of carbon-bisulfide. The carbon is subjected to this treatment until the requisite activation has been acquired, when the process is interrupted. By suitably selecting the carbon to be used as the starting material, the size of the grain of the same, the temperature, the duration of the action of the sulfur and the concentration of the sulfur vapor (which can, for example, be varied by the admixture thereto of inert gases and vapors, such as nitrogen, carbon-bisulfide and the like) it is possible to produce at will active carbon possessed of defined properties. Thus, for example, when 24 parts by weight of pine wood previously carbonized at 500° C. are treated at 900° C. with sulfur vapor until about 76 parts by weight of carbon bisulfide have been produced, about 12 parts by weight of decolorizing carbon of good quality are obtained, the volume weight of which corresponds to from 100 to 120 grams per litre. However, by further prolonging the activation process a carbon can be obtained which equals highly active steam carbon as regards its power for decolorizing. Our experiments have proved that a carbon possessing a medium activity is obtained when about 40% of the carbon is converted into carbon-bisulfide and that a maximum activity is obtained when about 80% of the carbon is converted. The process for the activation of the carbon is with advantage combined with that for the manufacture of carbon-bisulfide. According to the prevailing conditions, the whole process can be carried out in retorts provided with external heating, or in an apparatus arranged for electrical resistance heating, or lastly, the amount of heat necessary to cause the decomposition of the carbon, according to the equation $C+S_2=CS_2$, may be supplied by superheating of the sulfur vapor. The process may be carried out in a discontinuous manner or continuously with mechanical agitation of the carbon, for example in suitably constructed shaft or revolving furnaces.

We claim:—

1. A process for producing active carbon which comprises treating carbon at a temperature of about 800–1000° C. with sulfur vapors until the carbon has acquired the desired activation, and discharging the residual carbon.

2. A process for producing active carbon which comprises treating carbon at a temperature of about 800–1000° C. with sulfur vapors until about 40–80% of the carbon is converted into carbon-bisulfide, and discharging the residual carbon.

3. The process for producing active carbon which comprises treating carbon at a temperature of about 800–1000° C. with sulfur vapors, separating the carbon bisulfide thus obtained according to the usual methods, interrupting the process when about 40–80% of the carbon is converted into carbon bisulfide, and discharging the residual carbon according to the usual methods.

4. Active carbon produced by the action of sulfur upon carbon at a temperature of about 800–1000° C.

In testimony whereof we have hereunto set our hands.

JULIUS DRUCKER.
HEINZ THIENEMANN.